Sept. 16, 1930. J. KATZMAN 1,775,724
FRICTION CLUTCH DRIVING MECHANISM
Original Filed Dec. 6, 1927
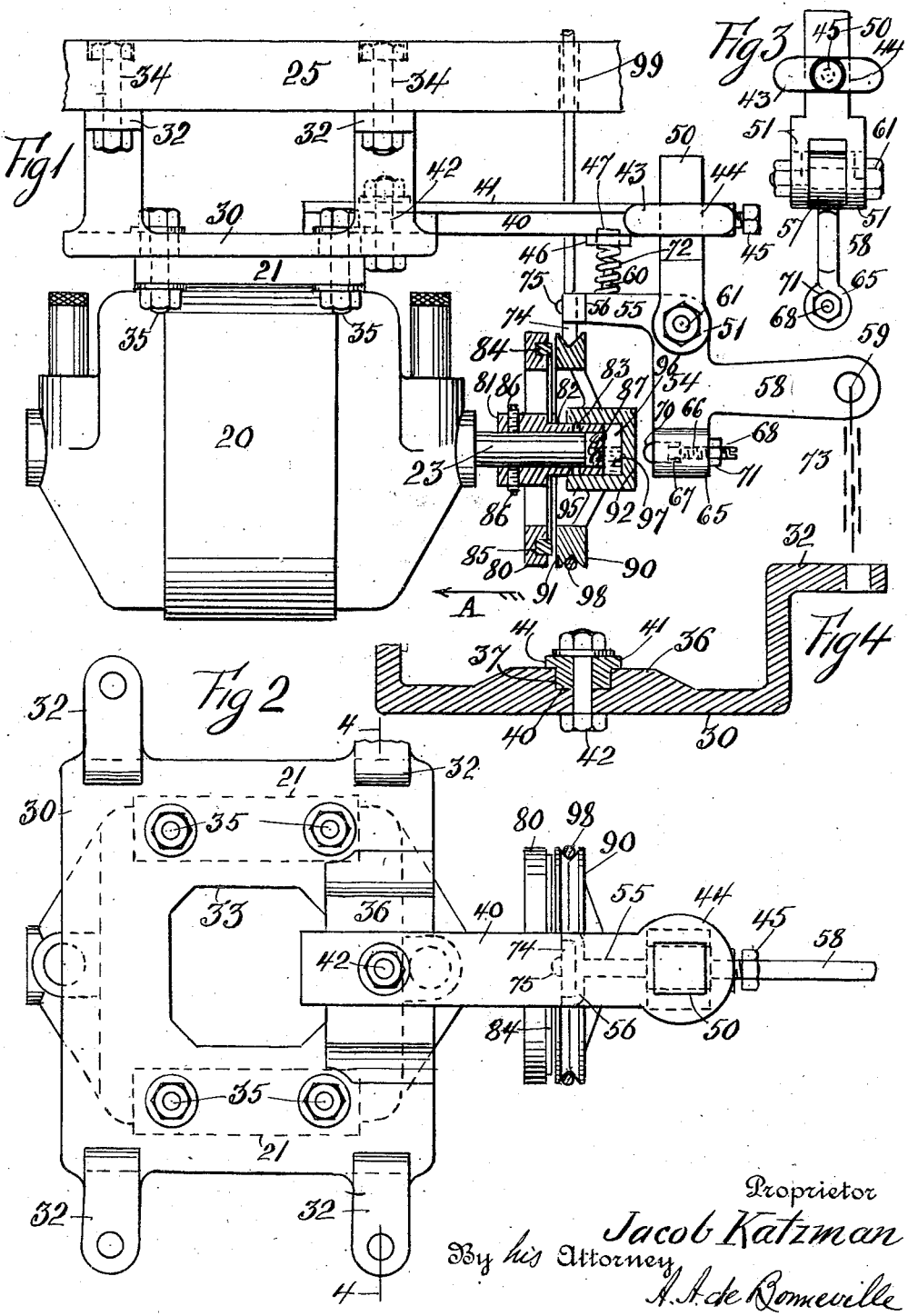
Proprietor
Jacob Katzman
By his Attorney
A. A. de Bonneville Patented Sept. 16, 1930

1,775,724

UNITED STATES PATENT OFFICE

JACOB KATZMAN, OF BROOKLYN, NEW YORK

FRICTION-CLUTCH-DRIVING MECHANISM

Application filed December 6, 1927, Serial No. 238,192. Renewed March 7, 1930.

This invention relates to friction clutch driving mechanism, and is an improvement of the mechanism described and claimed in my U. S. Letters Patent No. 1,647,450 dated Nov. 1st, 1927.

The object of the invention is the production of a friction clutch driving mechanism, which can easily be connected to electric motors of different sizes. The second object of the invention is the production of a friction clutch driving mechanism with adjustable parts, which can be adjusted to secure the efficient operation of all its parts. The third object of the invention is the production of a clutch driving mechanism, by means of which a sewing machine or other mechanism can be intermittently operated, by means of an electric motor.

In the accompanying drawings Fig. 1 represents a side elevation, partly in axial section, of an exemplification of the improved friction clutch driving mechanism with its electric motor and supporting table; Fig. 2 shows a partial top plan view of Fig. 1 partly broken away; Fig. 3 indicates a right hand side view of a fragmentary portion of Fig. 1 and Fig. 4 is a section of Fig. 2 on the line 4, 4.

Referring to the drawings, an electric motor is indicated with the housing 20 having formed therewith the feet 21. The armature shaft of the motor is indicated at 23. Binding posts, not shown, are provided for the electric motor, for wires that conduct current thereto in the usual way. A table is shown at 25.

A supporting bracket comprises the platform 30, that has formed therewith the feet 32 and the central opening 33. Bolts 34 fasten the feet 32 to the table 25, and bolts 35 fasten the feet 21 to the platform 30. A projection 36 having the guide groove 37 is formed with the platform 30. A supporting bar 40 having the longitudinal side flanges 41 is adjustably and slidably secured in the guide groove 37 of the projection 36, by means of the bolt 42, and extends from one side of the platform 30. At the outer end of the bar 40 is formed the boss 43, having the rectangular opening 44. A clamping bolt 45 is in threaded engagement with an opening in the boss 43. An extension 46 having the cavity 47 is formed with the lower face of the bar 40.

An adjusting bar 50 rectangular in cross section has formed therewith the bifurcated lower end comprising the members 51. The bar 50 extends through the opening 44 and can be clamped in different positions to the boss 43, by means of the clamping bolt 45.

An operating lever is indicated with the body portion 54. A supporting arm 55 extends from the upper end of the portion 54, and has formed therewith the U shaped clamping head 56, and the boss 57. From the lower end of the portion 54 extends the operating arm 58, having the opening 59 in its outer end. A pin 60 extends from the arm 55. the arm 55 is pivoted to the members 51, by means of the screw pivot 61. Below the body portion 54 is formed the boss 65 having the threaded opening 66 and the enlarged cylindrical opening 67. An adjusting screw 68 is in threaded engagement with the opening 66, and has extending therefrom the adjusting plug 70. A nut 71 is provided for the screw 68. A helical spring 72 has one end supported on the pin 60 and its other end is seated in the cavity 47. A chain 73 has one end thereof extending through the opening 59 of the arm 58, to which it is connected. A brake block 74 is detachably fastened to the head 56, by means of the screw 75.

A disc 80 has formed therewith on one side the hub 81, and on the other side the sleeve 82 having the openings 83. A friction ring 84, preferably of leather is secured in an annular groove 85 formed in the disc 80. The disc 80 is fastened to the armature shaft 23, by means of the screws 86. Fibrous packing 87, to absorb a lubricant is located in the sleeve 82.

A groove pulley 90 is indicated with the annular bearing face 91 at one side and the abutting head 92 at its other side. The said pulley has formed therewith the sleeve 95, which constitutes an extension of the cylindrical cavity 96 for a lubricant 97. A belt 98 for the pulley 90 extends through openings 99 in the table 25.

The elements of the friction clutch driving mechanism when not transmitting rotation to its pulley 90 from the electric motor, are positioned as indicated in the drawings. To transmit rotation to the said pulley 90, and thereby to a sewing machine or other mechanism through the belt 98, the operator pulls the chain 73, by means of which the adjusting plug 70 bears against the abutting head 92. By this means the pulley 90 slides in the direction of the arrow A, and the annular bearing face 91 of said pulley is brought into frictional engagement with the adjoining face of the friction ring 84. By this means the rotation of the disc 80, which rotates with the armature shaft 23 of the electric motor, is transmitted to the pulley 90. While the operator pulls the chain 73, the arm 55 swings up and releases the brake block 74 from the pulley 90. When the chain 73 is released the helical spring 72 automatically swings down the arm 55, and thereby the brake block 74 contacts with the groove of the pulley 90 and moves the pulley 90 in a direction opposite to the arrow A and stops said pulley.

The platform 30, of the supporting bracket provides means for clamping electric motors of various sizes thereto, and the supporting bar 40 and also the adjusting bar 50 also serve to be enabled to clamp electric motors of different sizes to the platform 30. To use motors of which the armature shaft extend different distances from the center line thereof, the adjusting bar 40 is clamped in position to the platform to suit the location of the armature shaft. The adjusting bar 50 is moved vertically and clamped in proper position to locate the brake block 74 in proper position to initially bear on the side of its groove away from the disc 80, to move the pulley in a direction opposite to the arrow A, to disengage it from said disc 80 and to hold it in place.

Various modifications may be made in the invention and the present exemplification is to be taken as illustrative and not limitative thereof.

Having described my invention what I desire to secure by Letters Patent and claim is:

1. In a friction clutch driving mechanism the combination of a supporting bracket, an electric motor fastened to said bracket, a supporting bar adjustably fastened to the supporting bracket, an adjusting bar adjustably clamped to said supporting bar, an operating lever pivoted to the adjusting bar, and a clutch mechanism supported by the armature shaft of the motor, positioned to be actuated by the operating lever.

2. In a friction clutch driving mechanism the combination of a supporting bracket having a platform, an electric motor fastened to the platform, a supporting bar adjustably fastened to the platform of the supporting bracket and extending from one side thereof, an adjusting bar adjustably clamped to said supporting bar, an operating lever pivoted to the adjusting bar, a brake block and an adjusting plug carried by said operating lever, a disc supported on the armature shaft of the electric motor and a groove pulley rotatively associated with said disc, said brake block adapted to engage the groove of the pulley and said adjusting plug adapted to bear against said pulley.

3. In a friction clutch driving mechanism the combination of a supporting bracket, an electric motor fastened to the bracket, a supporting bar adjustably fastened to the supporting bracket, an adjusting bar adjustably clamped to the supporting bar, an operating lever pivoted to the adjusting bar, a brake block and an adjusting plug supported by the operating lever, a disc fastened to the armature shaft of the motor, a sleeve extending from one side of said disc, a groove pulley rotatively supported on said sleeve, said brake block adapted to engage the groove of said pulley, said adjusting plug adapted to bear against said pulley and means to swing the operating lever.

4. In a friction clutch driving mechanism the combination of a supporting bracket having a platform, an electric motor fastened to said platform, a supporting bar adjustably fastened to said supporting bracket, an adjusting bar adjustably clamped to said supporting bar, an operating lever pivoted to the adjusting bar, a supporting arm extending from one end of the operating lever, an operating arm extending from the other end of the lever, a brake block fastened to the outer end of the supporting arm, an adjusting plug supported in the lower end of the operating arm, a spring bearing between the supporting arm and the supporting bar, a disc fastened to the armature shaft of the motor, a sleeve extending from one side of said disc and a groove pulley rotatively supported on the sleeve, said brake block adapted to engage the groove of said pulley, said pulley having an abutting head, the supporting arm of the operating lever when swung down contacting said brake block with the groove of said pulley separating the pulley from its accompanying disc, and said adjusting plug contacting with the abutting head of the pulley when the supporting arm of the operating lever is swung up to force the pulley against its adjoining disc.

In testimony whereof I affix my signature.

JACOB KATZMAN.